United States Patent
Cronin et al.

(10) Patent No.: US 11,461,863 B2
(45) Date of Patent: Oct. 4, 2022

(54) IDEA ASSESSMENT AND LANDSCAPE MAPPING

(71) Applicant: Bright Marbles, Inc., Menlo Park, CA (US)

(72) Inventors: John Cronin, Jericho, VT (US); Burt Cummings, Menlo Park, CA (US); Charles Root, Underhill, VT (US); Michael D'Andrea, Burlington, VT (US); Jeffrey Goodwin, Montpelier, VT (US)

(73) Assignee: BRIGHT MARBLES, INC., Menlo Park, CA (US)

(*) Notice: Subject to any disclaimer, the term of this patent is extended or adjusted under 35 U.S.C. 154(b) by 361 days.

(21) Appl. No.: 16/551,365

(22) Filed: Aug. 26, 2019

(65) Prior Publication Data

US 2020/0065924 A1 Feb. 27, 2020

Related U.S. Application Data

(60) Provisional application No. 62/722,599, filed on Aug. 24, 2018, provisional application No. 62/722,625, filed on Aug. 24, 2018.

(51) Int. Cl.
| | | |
|---|---|---|
| *G06Q 50/18* | (2012.01) | |
| *G06F 16/9538* | (2019.01) | |
| *G06F 40/20* | (2020.01) | |

(52) U.S. Cl.
CPC ....... *G06Q 50/184* (2013.01); *G06F 16/9538* (2019.01); *G06F 40/20* (2020.01); *G06F 2216/11* (2013.01)

(58) Field of Classification Search
CPC ... G06Q 50/184; G06F 16/9538; G06F 40/20; G06F 2216/11
(Continued)

(56) References Cited

U.S. PATENT DOCUMENTS

| | | |
|---|---|---|
| 5,059,528 A | 10/1991 | Bollen et al. |
| 5,814,467 A | 9/1998 | Curtiss et al. |

(Continued)

FOREIGN PATENT DOCUMENTS

| | | | | |
|---|---|---|---|---|
| KR | 100490725 B1 * | 5/2005 | ............. | G06F 16/93 |
| KR | 2018-0019869 | 2/2018 | | |

OTHER PUBLICATIONS

B. Priyantha, D. Lymberopoulos and J. Liu, "LittleRock: Enabling Energy-Efficient Continuous Sensing on Mobile Phones," in IEEE Pervasive Computing, vol. 10, No. 2, pp. 12-15, Apr.-Jun. 2011, doi: 10.1109/MPRV.2011.28. (Year: 2011) (Year: 2011).*

(Continued)

*Primary Examiner* — Michael Young
(74) *Attorney, Agent, or Firm* — Polsinelli LLP (57) ABSTRACT

Embodiments of the present invention include systems and methods for systematically evaluating idea quality in accordance with specified rules. In addition, such assessments may also be used to initiate workflows for improving the quality of a given idea. Some embodiments may provide for assessment of the novelty of idea in real-time (e.g., during an innovation or ideation session). Such initial assessments may further be updated in real-time as the idea is discussed further. Such assessment may rely on voice-activated and intelligence-driven searching of various data sources to identify the context of the idea so as to provide an objective basis for the assessment.

16 Claims, 7 Drawing Sheets

(58) Field of Classification Search
USPC .......................................................... 705/310
See application file for complete search history.

(56) References Cited

U.S. PATENT DOCUMENTS

| | | | |
|---|---|---|---|
| 6,266,635 | B1 | 7/2001 | Sneh |
| 6,934,905 | B1 | 8/2005 | Tighe |
| 7,493,253 | B1 | 2/2009 | Ceusters et al. |
| 7,711,547 | B2 | 5/2010 | Abir |
| 7,996,440 | B2 | 8/2011 | Probst et al. |
| 8,131,557 | B2 | 3/2012 | Davis et al. |
| 9,047,857 | B1 | 6/2015 | Barton |
| 9,111,214 | B1 | 8/2015 | Sharma et al. |
| 9,904,675 | B2 | 2/2018 | Kantor et al. |
| 9,912,769 | B2 | 3/2018 | Gong et al. |
| 10,013,980 | B2 | 7/2018 | Borsutsky et al. |
| 10,834,145 | B2 | 11/2020 | Buddenbaum et al. |
| 11,081,113 | B2 | 8/2021 | Cronin |
| 11,164,065 | B2 | 11/2021 | Cronin |
| 11,189,267 | B2 | 11/2021 | Cronin |
| 2001/0034629 | A1 | 10/2001 | Cronin |
| 2004/0189702 | A1 | 9/2004 | Hlavac et al. |
| 2005/0182773 | A1 | 8/2005 | Feinsmith |
| 2006/0036452 | A1 | 2/2006 | Williams |
| 2006/0036529 | A1 | 2/2006 | Williams |
| 2006/0036632 | A1 | 2/2006 | Williams |
| 2006/0036635 | A1 | 2/2006 | Williams |
| 2008/0046394 | A1 | 2/2008 | Zhou et al. |
| 2010/0174760 | A1 | 7/2010 | Longobardi et al. |
| 2012/0166414 | A1 | 6/2012 | Decker et al. |
| 2012/0233037 | A1 | 9/2012 | Lamoureux et al. |
| 2013/0117018 | A1 | 5/2013 | O'Sullivan et al. |
| 2014/0122056 | A1 | 5/2014 | Duan |
| 2014/0122083 | A1 | 5/2014 | Xiaojiang |
| 2015/0007055 | A1 | 1/2015 | Lemus et al. |
| 2015/0020002 | A1 | 1/2015 | McKenzie et al. |
| 2015/0271218 | A1 | 9/2015 | Steingrimsson |
| 2016/0021557 | A1 | 1/2016 | Tabet et al. |
| 2016/0044073 | A1 | 2/2016 | Rosenberg |
| 2017/0235848 | A1 | 8/2017 | Van Dusen et al. |
| 2017/0310613 | A1 | 10/2017 | Lalji et al. |
| 2017/0365021 | A1* | 12/2017 | Stading ............ G06Q 10/06311 |
| 2018/0018564 | A1 | 1/2018 | Erenrich et al. |
| 2018/0032576 | A1 | 2/2018 | Romero |
| 2018/0131645 | A1 | 5/2018 | Magliozzi et al. |
| 2018/0174103 | A1 | 6/2018 | Auger |
| 2018/0191596 | A1 | 7/2018 | Bhaya et al. |
| 2018/0218285 | A1 | 8/2018 | Oliner et al. |
| 2018/0300829 | A1* | 10/2018 | Crabtree ................ G06N 20/00 |
| 2018/0357032 | A1 | 12/2018 | Popovich et al. |
| 2019/0052701 | A1 | 2/2019 | Rathod |
| 2019/0079996 | A1 | 3/2019 | Mochel et al. |
| 2019/0279619 | A1 | 9/2019 | Krasadakis |
| 2020/0066259 | A1 | 2/2020 | Cronin |
| 2020/0066277 | A1 | 2/2020 | Cronin |
| 2020/0167630 | A1 | 5/2020 | Cronin |
| 2021/0350806 | A1 | 11/2021 | Cronin |
| 2022/0051070 | A1 | 2/2022 | Cronin |
| 2022/0084507 | A1 | 3/2022 | Cronin |

OTHER PUBLICATIONS

U.S. Appl. No. 16/551,509 Office Action dated Apr. 14, 2021.
U.S. Appl. No. 17/381,718, John Cronin, Idea Scoring for Creativity Tool Selection, filed Jul. 21, 2021.
U.S. Appl. No. 16/550,992 Office Action dated Jun. 2, 2021.
U.S. Appl. No. 17/536,459, John Cronin, Intelligence-Driven Virtual Assistant for Automated Idea Documentation, filed Nov. 29, 2021.
U.S. Appl. No. 17/514,907, John Cronin, Ideation Virtual Assistant Tools, filed Oct. 29, 2021.
U.S. Appl. No. 16/550,992, John Cronin, Intelligence-Driven Virtual Assistant for Automated Idea Documentation, filed Aug. 26, 2019.
PCT/US19/48115, Intelligence-Driven Virtual Assistant for Automated Idea Documentation, Aug. 26, 2019.
PCT/US19/48158, Idea Assessment and Landscape Mapping, Aug. 26, 2019.
U.S. Appl. No. 16/551,509, John Cronin, Ideation Virtual Assistant Tools, filed Aug. 26, 2019.
PCT/US19/48182, Ideation Virtual Assistant Tools, Aug. 26, 2019.
U.S. Appl. No. 16/551,055, John Cronin, Idea Scoring for Creativity Tool Selection, filed Aug. 26, 2019.
PCT/US19/48122, Idea Scoring for Creativity Tool Selection, Aug. 26, 2019.

* cited by examiner

| 501 Patent number | 502 Patent Title | 503 Relevancy Score |
|---|---|---|
| US2006036632A1 | System and method for patent evaluation using artificial intelligence | 90 |
| US5059528A | Expression of human proapolipoprotein a-i | 88 |
| US5814467A | APO AI polypeptides, diagnostic methods and systems for quantifying APO AI, and therapeutic methods | 87 |
| US2006036452A1 | System and method for patent portfolio evaluation | 75 |
| US2006036635A1 | System and methods for patent evaluation | 75 |
| US2006036529A1 | System and method for patent evaluation and visualization of the results thereof | 50 |
| US2004189702A1 | Artificial intelligence platform | 40 |

| Category | Description | Idea Records |
|---|---|---|
| Standard Metering | Definition: A standard meter measures water by mechanical, electromechanical, or electronic means and requires manual reading. | 1, 27 |
| | Keywords: manual reading. | 5, 11 |
| AMR – Automatic Meter Reading | Definition: An advanced meter uses a one-way communication module embedded in or attached to the meter to collect and store meter data. An advanced meter may also analyze the data for more efficient resource management and operations. | 2, |
| | Keywords: one-way communication, collect & store meter data, collect meter data for billing, analyze data for resource management & operations. | |
| AMI - Smart Metering | Definition: A smart meter can collect and store interval data, remotely connect and disconnect to other devices, transmit large data packets and uses two-way communications. | 9, |
| | Keywords: interval data, remotely connect/disconnect, sending detailed information, receive commands, interface with other devices, in-home display, smart thermostat/appliances, home area network, advanced control systems. | 3, 4, |
| Water Meter Design | Definition: The components and design elements that make up a meter. | 15, 21 |
| | Keywords: body, housing, mechanical, seal, spinner, turbine, tamper resistance, electrical, power, sensors, display electronics, power harvesting, energy scavenging, ultrasonic, electro-magnetic, fluidic oscillation. | 22, 23 |
| Communication Modules | Definition: Components within meter used for communicating data. | 12, 13, 14 |
| | Keywords: endpoint, encoder receiver transmitter (ERT), phone, telephone, radio frequency (RF), cellular, power line carrier (PLC), Ethernet, technologies, communications algorithms, hardware, protocols, quality of service (QoS), synchronization, event reporting, firmware | 8, 16, 17 |
| Meter Install & Programming | Definition: Methods, systems, and hardware associated with installation and programming water meters. | 6, 24 |
| | Keywords: installation, mounting/install hardware, method of install, programming | 7, 10 |

FIG. 7

IDEA ASSESSMENT AND LANDSCAPE MAPPING

CROSS-REFERENCE TO RELATED APPLICATIONS

The present patent application claims the priority benefit of U.S. provisional patent application 62/722,599 filed Aug. 24, 2018; and U.S. provisional patent application 62/722,625 filed Aug. 24, 2018, the disclosures of which are incorporated herein by references.

BACKGROUND OF THE INVENTION

1. Field of the Disclosure

The present disclosure is generally related to innovation management applications. More specifically, the present disclosure is related to idea assessment and landscape mapping.

2. Description of the Related Art

Presently available systems for managing innovations are generally data and document management systems. Such systems are directed towards tracking and organizing data and documents. Such systems are unable, however, to assess the quality and potential of an idea, and as such, generally rely on human administrators to assess idea quality. The problem with using human administrators, however, is that human actors may be subject to different preferences, biases, and other tendencies. As such, human judgments may often be subjective, arbitrary, and capricious. The assessment of the quality of an idea by human actors may therefore be highly dependent on who is performing the assessment, and there may be a lot of variability, inconsistency, and unpredictability in how ideas are assessed. Because presently available systems lack the ability to systematically assess the quality of an idea, such system further lack the ability to improve the quality of the idea.

Moreover, because presently available systems rely on human actors—supervisors, managers, professional vendors, etc.—to assess the quality of an idea, there may often be time delays between idea creation and idea development/implementation. That is because brainstorming sessions may generate multiple different ideas, each of which need to be assessed and selected for further development and/or implementation. Moreover, because human assessor are subject to personal biases as noted above, some ideas may be undervalued and receive short shrift, while others may be overvalued without a rational basis.

Thus, there is a need in the art for improved systems and methods for assessing idea quality, as well as improved systems and methods for improving the quality of ideas in a systematic and predictable fashion.

SUMMARY OF THE CLAIMED INVENTION

Embodiments of the present invention include systems and methods for systematically evaluating idea quality in accordance with specified rules. In addition, such assessments may also be used to initiate workflows for improving the quality of a given idea. Some embodiments may provide for assessment of the novelty of idea in real-time (e.g., during an innovation or ideation session). Such initial assessments may further be updated in real-time as the idea is discussed further. Such assessment may rely on voice-activated and intelligence-driven searching of various data sources to identify the context of the idea so as to provide an objective basis for the assessment.

Further embodiments may also provide for landscape mapping for a given idea in real-time (e.g., during a brainstorming session). Such landscape mapping may include parsing one or more keywords associated with the idea into categories, which may then be used in conjunction with contextual data to prepare a structured map. For example, an idea—and its associated keywords—may be associated with a variety of elements and sub-elements. A landscape map may illustrate such elements and sub-elements with contextual data, which may be grouped into categories. Such groupings may further be indicative of different levels of potential for further innovation. Such a landscape may further be sortable, actionable, and updateable.

BRIEF DESCRIPTIONS OF THE DRAWINGS

FIG. 7 illustrating an exemplary database of a landscape map generated for an idea in accordance with the method of FIG. 6.

DETAILED DESCRIPTION

Embodiments of the present invention include systems and methods for systematically evaluating idea quality in accordance with specified rules. In addition, such assessments may also be used to initiate workflows for improving the quality of a given idea. Some embodiments may provide for assessment of the novelty of idea in real-time (e.g., during an innovation or ideation session). Such initial assessments may further be updated in real-time as the idea is discussed further. Such assessment may rely on voice-activated and intelligence-driven searching of various data sources to identify the context of the idea so as to provide an objective basis for the assessment.

Further embodiments may also provide for landscape mapping for a given idea in real-time (e.g., during a brainstorming session). Such landscape mapping may include parsing one or more keywords associated with the idea into categories, which may then be used in conjunction with contextual data to prepare a structured map. For example, an idea—and its associated keywords—may be associated with a variety of elements and sub-elements. A landscape map may illustrate such elements and sub-elements with contextual data, which may be grouped into categories. Such groupings may further be indicative of different levels of potential for further innovation. Such a landscape may further be sortable, actionable, and updateable.

Figure 1:
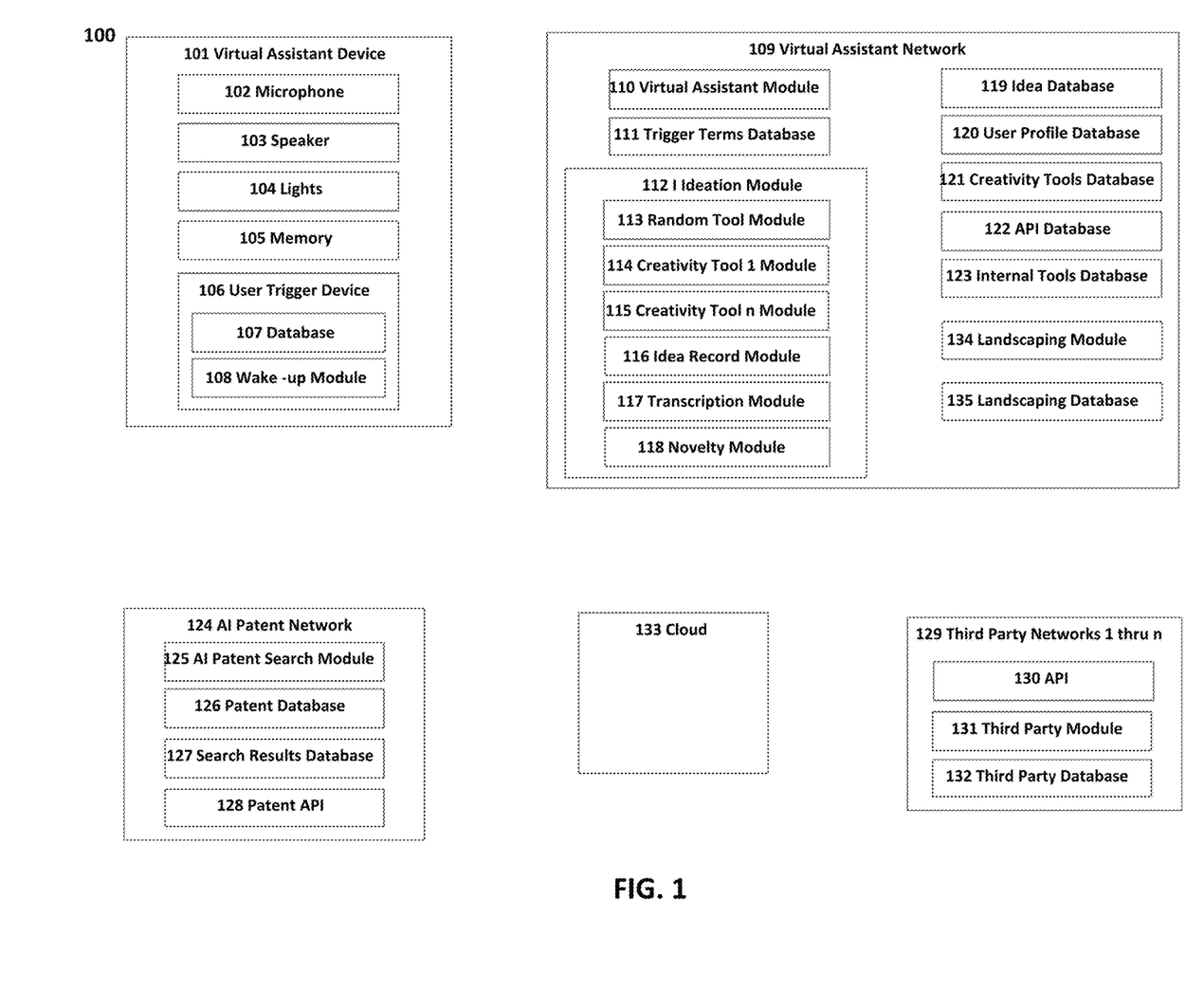
FIG. 1 illustrates an exemplary network environment in which a system for idea assessment and mapping may be implemented.

FIG. 1 illustrates an exemplary network environment 100 in which a system for idea assessment and mapping may be implemented. Network environment 100 may comprise of a virtual assistant device 101, a virtual assistant network 109, AI patent network 124, and third party network 129, all of which may communicate through a communication network or cloud 133.

Virtual assistant device 101 may include a processor and interface(s) such as microphone 102, speaker 103, and light 104. In addition, virtual assistant device may include a memory 105 user trigger device 106, database 107, and wake up module 108. The processor may be configured to decode and execute any instructions (e.g., associated with application or modules), whether stored locally or received from one or more other electronic devices or server(s). The processor may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor may be configured to execute one or more computer-readable program instructions, such as program instructions to carry out any of the functions described in this description.

The interface(s) may help an operator to interact with the virtual assistant device 101. The interface(s) of the virtual assistant device 101 may either accept an input from the operator or provide an output to the operator, whether visually or through audio. The interface(s) may include a microphone 102, a speaker 103, and/or a light 104. In some embodiments, the interface(s) may also include various types of user interfaces, such as a command line interface (CLI), graphical user interface (GUI), or a voice interface.

In one embodiment, the microphone 102 corresponds to an instrument that converts sound waves into electrical energy variations, which may then be amplified, transmitted, or recorded. The microphone 102 may therefore capture audio data and convert into a digital file for storage in a database in memory 105 of the virtual assistant device 101.

Speaker 103 may correspond to a device containing a transducer for converting electrical signals (electric current) into sound waves (acoustic energy) to produce sound. Further, the light 104 on the virtual assistant device 101 may be activated to illuminate, change colors, and indicate different status (e.g., actions, alerts, state). The type of light 104 may include but not limited to light-emitting diodes (LEDs).

The memory 105 may store various modules implemented as a program. The memory 105 may comprise various databases for storing input data (e.g., speech or audio data captured by microphone 102), whether temporarily or permanently. The databases may store speech and audio data captured by the microphone 102 on the virtual assistant device 101. One or more different databases may be stored in memory 105. Usage of multiple different databases may also allow segregated storage of different data and may thus reduce time to access required data.

In some embodiments, the user trigger device 106 may provide an interface that allows the user to trigger an action in the virtual assistant device 101 and the virtual assistant network 109. User trigger device 106 may include, for example, a physical or graphical button that may be selected or activated, resulting in a signal being communicated either wirelessly or directly to virtual assistant device 101 or virtual assistant network 109. The user trigger device 106 may further be associated with a database 107 for storing trigger data (e.g., conditions under which each action is triggered, pre-programmed actions and replies).

In addition to a trigger database 107, user trigger device 106 may further include a wake-up module 108 executable by a processor to continuously poll for audio data via the microphone 102. Such polling by wake-up module 108 may specifically detect a predetermined wake-up term, phrase, keyword, change in tone or volume, or other audio-based trigger.

The communication (or cloud) network 133 may be inclusive of wired and wireless networks. The communication network 133 may be implemented, for example, using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques known in the art. The communication network 133 may allow ubiquitous access to shared pools of configurable system resources and higher-level services that can be rapidly provisioned with minimal management effort, often over the Internet and may rely on shared resources to achieve coherence and economies of scale, like a public utility, while third-party clouds enable organizations to focus on their core businesses instead of expending resources on computer infrastructure and maintenance.

Virtual assistant network 109 can be located on a remote server in the cloud or be integrated into virtual assistant device 101 or associated servers. Virtual assistant network 109 may include virtual assistant module 110, trigger terms database 111, and ideation management module 112. The ideation module 112 may include random tool module 113, creativity tool 1 module 114, creativity tool n module 115, idea record module 116, transcription module 117, and novelty module 118. Virtual assistant network 109 may further include idea database 119, user profile database 120, creativity tools database 121, API database 122, internal tools database 123, landscaping module 134, and landscaping database 135.

Virtual assistant module 110 may include virtual assistants known in the art, such as Amazon Alexa, Google Assistant, Apple Siri, Microsoft Cortana, etc. Virtual assistant module 110 can use certain words, phrases, invocations, or prompts to trigger other applications or modules or actions.

Trigger terms database 111 may load and store the words, phrases, terms, invocations, or prompts that are used to trigger certain actions or start applications. In one embodiment, the trigger terms database 111 may load and store the words, phrases, terms, invocations, or prompts that are used to trigger certain actions or initiate execution of an associated module or application. The trigger terms database 111 may also comprise trigger terms for updating existing trigger terms, keywords, phrases, or invocations. The trigger terms database 111 may further comprise an action or execution storage section for storing actions to be taken or modules/applications to be executed upon identification of the associated trigger term. The trigger terms database 111 may further comprise algorithm storage section for storing algorithms or instructions executable by processor 127. Such algorithms or instructions may identify the specific application or module, as well as parameters and conditions on how such application or module is to be executed. Further, pre-programmed responses may also be stored in the trigger terms database 111.

Ideation module 112 may be triggered, for example, when the virtual assistant module 110 recognizes the keyword, term or phrase assigned to initiate execution of the Ideation module 112.

Random tool module 113 may be triggered by the ideation module 112 and can be any number of creativity tools that are randomly used to provide a user with random creativity data. For example, a user may want to brainstorm ideas for the keyword "shovels," and the random tool module 113 may initially select one of various creativity tools, such as word association. The next time, the random tool module 114 may provide the user with one or more different definitions rather than the word association activity.

Creativity tool 1 module 114 and creativity tool n module 115 may be inclusive of any number of creativity tools used to spark ideas. For example, ideation module 112 may select from among a variety of different types of creativity tools and trigger creativity tool 1 module 114. Such selection may be random, based on the user(s), or driven by artificial intelligence based on a current state of a conversation or other user interaction. Such creativity tool 1-*n* modules 114-115 may be executed to guide a brainstorming activity. For example, creativity tool 1 module 114 may detect one or more terms and select one or more verbs from a verb database (or other types of words, images, video clips, sounds, etc., from other types of databases) to associate with the detected term(s). Such terms and selected content may be output to the user(s) as prompts for further conversation, including that guided by creativity tool 1-*n* modules 114-115.

Idea record module 116 may be triggered when a prompt (e.g., defined term in trigger terms database 111) is detected by virtual assistant module 110. Such prompt may represent a request to document a potential idea being discussed or in development. Idea record module 116 may be executable to record conversations and interactions around the idea. Virtual assistant device 101 may store the recording captured by idea record module 116 in a specified idea database 119, as well as triggering transcription module 117 to transcribe the recording.

Transcription module 117 may transcribe the idea recording stored in the idea database 119. Transcription by transcription module 119 may be triggered by the idea record module 116. In some instances, the transcription may be sent or output—as prompted, at set intervals, or in real-time—to the user(s) or other modules, such as creativity tools 1-*n* modules 114-115 to prompt further brainstorming activities. The resulting transcription may also be stored in the idea database 119.

Novelty module 118 may evaluate and score identified ideas in accordance with defined rules. As each new idea is identified by the user(s) in the brainstorming session and stored to idea database 119, novelty module 118 may also send the transcription to AI patent network 124 for automated search. Novelty module 118 may further evaluate the search results returned by AI patent network 124 and generate a score, which may further be provided to the user through visual and/or audio feedback. For example, different colored lights 104 may represent different score levels of novelty.

Idea database 119 may store the user idea recordings, as well as the respective transcribed text. User profile database 120 may store information about the user(s), including but not limited to email address, title or role, usage data, idea generation, ideation training, etc. Creativity tool database 121 may store data regarding and related to the available creativity tools 1-*n* modules 114-115, including identification of any associated APIs for integration and interoperability with other modules in virtual assistant network 109. Some embodiments may include an API database 122 that may store current APIs for any of the modules in virtual assistant network 109.

Internal tools database 123 may store data for custom creativity tools not available through an API. For example, the internal tools database 123 may store previous ideas, products, or services that may serve as building blocks for continuing improvement and innovation. Such data stored in internal tools database 124 may be improved upon or used to direct a creativity or ideation session.

Landscaping module 134 may be triggered when a user executes the idea record module 116 and assigns the recorded idea to either an existing landscape category (e.g., from a user-provided landscape) or to a newly-created landscape category. Described in further detail with respect to FIG. 6, landscaping module 134 analyzes an idea, its background and related technical data, and provides a map regarding which parts of the idea are novel and quantitative metrics as to the same. Landscape database 135 may store the user-provided landscape, along with any categories created by the landscaping module 134.

Further, one or more third party networks 1-*n* 129 may further be connected to the communication network 133. Third party network 129 may include one or more networks on the Internet or cloud that stores module and data for different creativity tools. For example, a third party network 129 may host tools that could be accessed through an associated third party network API 130, as well as other subroutines, communication protocols, and tools for building software. The third party network 129 may comprise of a third party network application programming interface API 130, a third party module 131, and a third party database 132. Third party module 131 may input data (e.g., keyword or phrase) to initiate a creativity tool on the third party network 129 and then outputs the results to the ideation module 112. Third party database 132 may store data (e.g., associated with a creativity tool).

The AI patent network 124 may store modules (e.g., AI patent search module 125) and databases (e.g., patent database 126 and search results database 127) for running artificial intelligence-driven patent searches, scoring the results, and returning the score to the virtual assistant network 109 via the AI patent API 128.

The AI patent search module 125 may be executable by a processor to receive a transcribed idea (e.g., via the novelty module 118 on the virtual assistant network 109). Using artificial intelligence (AI) to continually refine searches, AI patent search module 125 may perform searches based on the transcribed idea. In particular, the AI patent search module 125 may generate queries for specific database (e.g., searches for patent data provided by patent databases 126). In addition, once query responses are returned, AI patent search module 125 may analyze the documents referenced in the responses for overlap to the transcribed idea. A score may be assigned based on a degree of similarity and dissimilarity.

The patent database 126 may be a local database or represent access to remote databases that store searchable patent data. Such remote databases may be hosted by third parties and may therefore correspond to third party database 132 and use third party APIs 130.

The search results database 127 may store the queries and query responses processed by AI patent search module 125, including the relevancy or similarity score. The patent API may be inclusive of any set of subroutine definitions, communication protocols, and tools for building software, and providing communication protocols to a variety of technical and patent databases 126 accessible on the Internet, cloud, or other remote servers.

Figure 2:
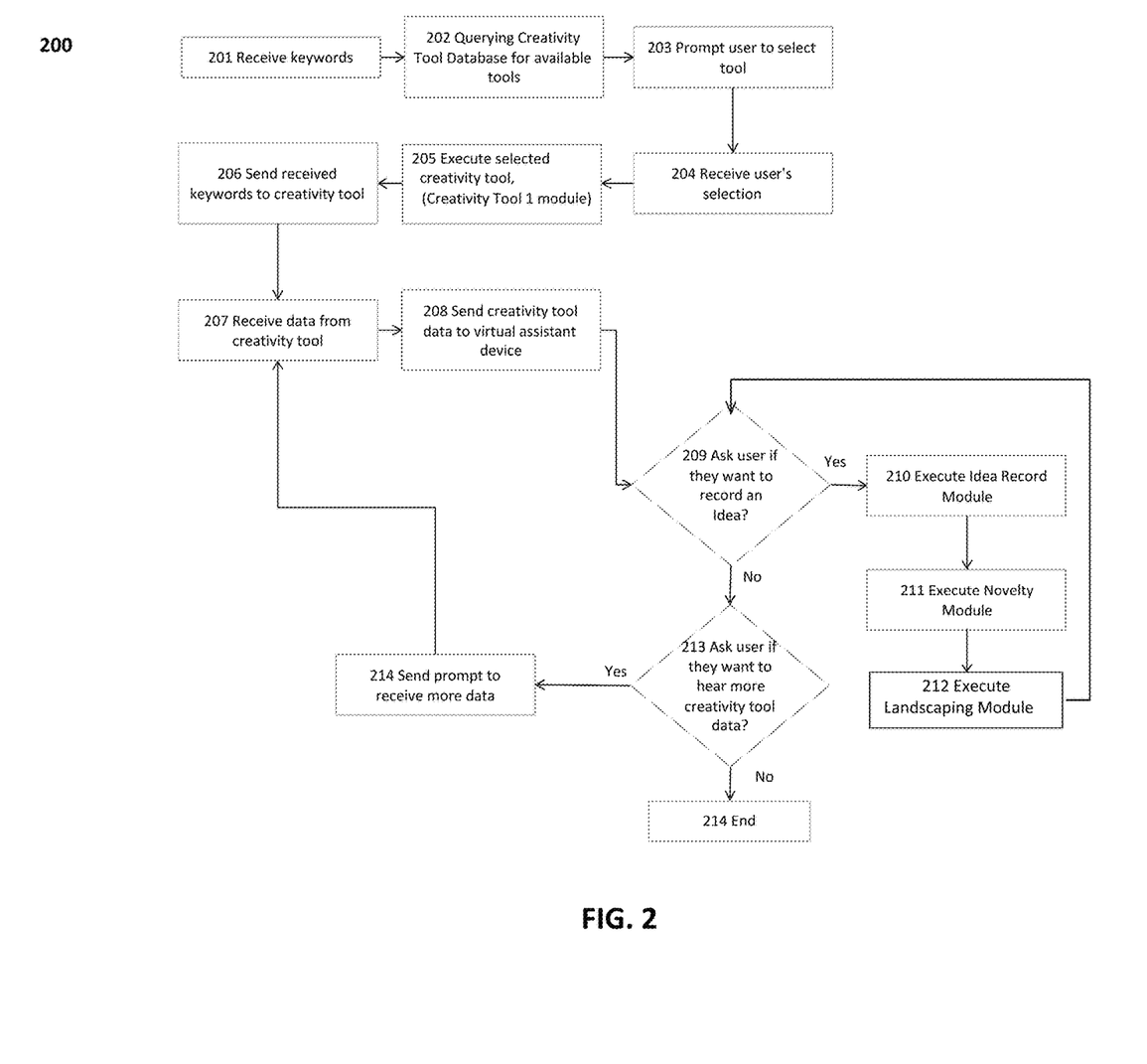
FIG. 2 is a flowchart illustrating an exemplary method for integrated idea assessment and mapping.

FIG. 2 is a flowchart illustrating an exemplary method 200 for integrated idea assessment and mapping. Such method 200 may be performed when ideation module 112 is executed.

In step 201, keywords may be received from the virtual assistant module 109, and in step 202, the creativity tool database 121 may be queried for the available creativity tools or methods. In different embodiments, random tool module 113 may be executed to select one or more creativity tool at random, or specific tools—such as word association, word definition, etc.—may be selected based on user request, preference, or other parameter. A recommendation or menu of options may also be presented to the user.

In step 203, the user may be prompted on the virtual assistant device 101 to select or execute a recommended creativity tool. In some embodiments, selection parameters may be pre-programmed, so as to automatically select or filter the available set of tools for a particular user, user group, or enterprise.

In step 204, the ideation module 112 may receive the creativity tool selection via audio captured by microphone 102 from the virtual assistant device 101, and in step 205, the selected creativity tool module (e.g., creativity tool 1 module 114) may be executed. For example, the user may select creativity tool 1, which may trigger execution of creativity tool 1 module 114.

In step 206, the keywords received from the virtual assistant module 110 may be sent to the creativity tool 1 module 114, and in step 207, the creativity tool 1 module 114 may generate or capture data or keywords during performance of the guided activity in the brainstorming session.

In step 208, the creativity tool data may then be sent to the user via the virtual assistant device 101, and in step 209, the user may then be asked using the virtual assistant device 101 if they would like to record an idea. If the user(s) do not indicate a wish to record an idea, the user(s) may then be asked if they want to hear more creativity tool data in step 213. If not, the method may end. If the user does wish to hear more creativity data, the method may proceed to step 214 where a prompt is sent to creativity tools database 121 (regarding the same or different creativity tool), and the method further returns to step 207 for further guided brainstorming related to a selected creativity tool.

If the user does indicate a wish to record an idea, the method may proceed to step 210 where the idea record module 116 may be executed. Once the idea record module 116 has completed, the method may proceed to step 211 where the novelty module 118 may be executed.

In step 212, the landscaping module 134 may be executed. Execution of the landscaping module 134 may result in categorizing the newly-recorded idea into an existing category on a landscape map or into a newly-created category (e.g., based on user-provided data or automatically). The method may thereafter return to step 209 for more ideas as needed.

In step 214, the user has indicated no further wish to record ideas and no further with to engage with any further creativity tools. As such, the method may end, and an end command may be sent to the virtual assistant module 110.

Figure 3:
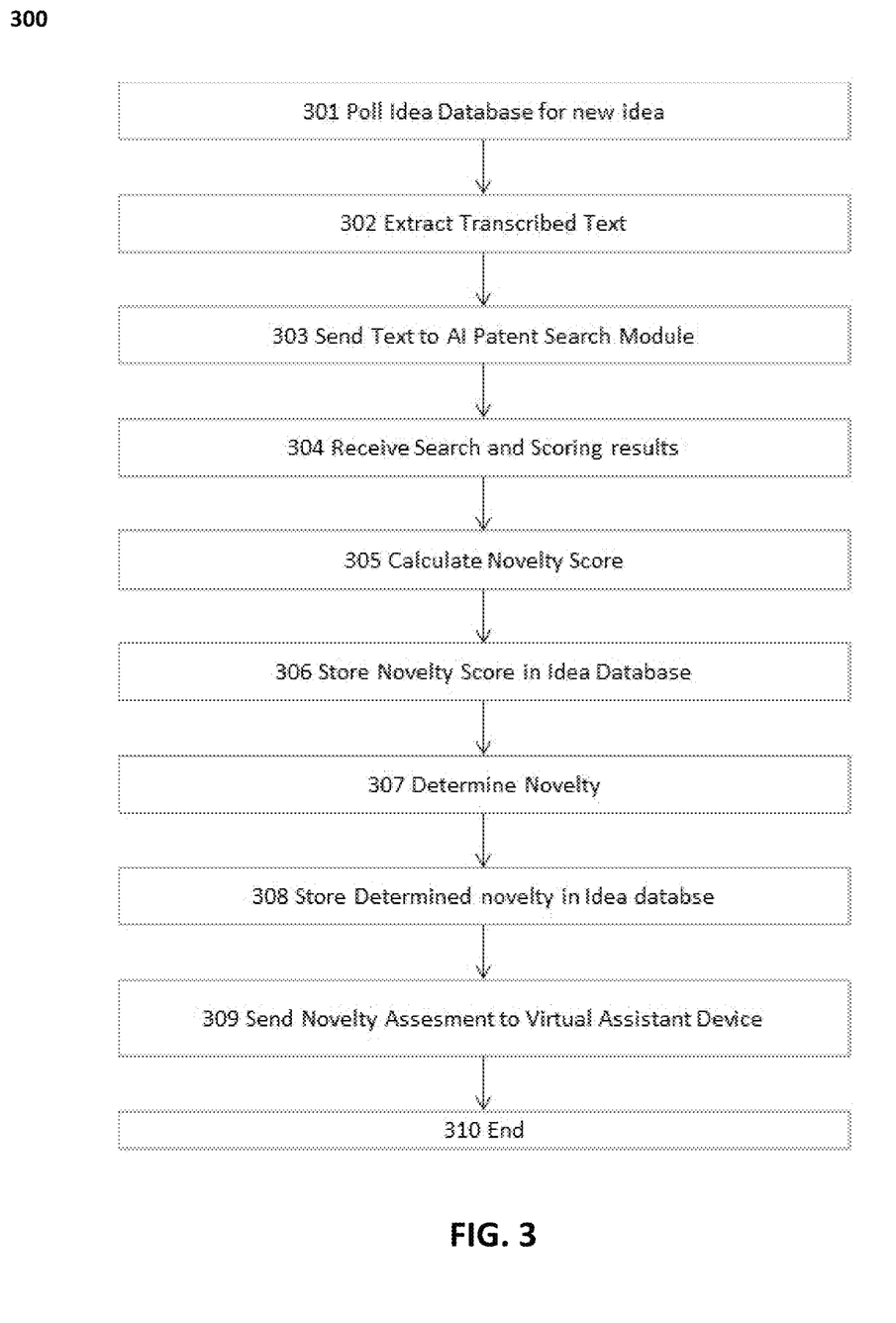
FIG. 3 is a flowchart illustrating an exemplary method for assessing idea quality.

FIG. 3 is a flowchart illustrating an exemplary method 300 for assessing idea quality. Such a method 300 may be performed by executing novelty module 118.

In step 310, an idea database 119 may be polled for the newest idea that has been added. For example, the novelty module 118 may evaluate a table in idea database 119 to identify whether any of the ideas have been evaluated and scored. Such ideas may have been newly added (e.g., as new ideas are being captured during a brainstorming session in real-time). In some embodiments, novelty module 118 may identify new ideas based on timestamps or lack of scores (e.g., novelty scores, similarity scores, relevancy scores).

In step 302, the transcribed text for an idea as stored in the idea database 119 may be retrieved, and in step 303, the retrieved text may then be sent to the AI patent search module 125. In step 304, the AI patent search module 125 may return the results (e.g., patents, patent publications, technical or scholarly literature) and similarity or relevancy scores to novelty module 118. In some embodiments, parts or all of the similarity or relevancy score may be provided to novelty module 118 for further analysis and generation of further metrics gauging novelty in one or more fields of technology.

In step 305, the relevancy score from the AI patent search module 125 may be used to calculate an overall relevancy score. For example, the novelty 118 module may take the relevancy score for the top ten search results returned by the AI patent search module 125 and calculate an average. In some embodiments, novelty module 118 may further update the scores in real-time as the brainstorming session goes on, and the idea is further refined.

In step 306, the calculated novelty score may then be stored in the idea database 119 with the respective idea, and in step 307, the novelty score may then be used to categorize the respective idea. For example, certain novelty score ranges may be defined or pre-programmed, including high, medium, and low likelihood of actually being novel. Each level may also correspond to different visual cues (e.g., different colored lights 104) for display on the virtual assistant device 101. For example, an idea categorized under a high likelihood of novelty may be represented by a range of <50 and may be indicated by the color green via lights 104 of the virtual assistant device 101, while medium likelihood of novelty may fall in the range of 50>75 and may be represented by the color yellow, and a low likelihood of novelty may fall into range of >75 may be represented by the color red.

In step 308, the determined likelihood of novelty (e.g. high, med, or low) and the corresponding visual cue (e.g., color of light 104) may be stored in the idea database 119 with the respective idea. In step 309, the determined novelty may then be sent to the virtual assistant device 101 for display of the associated visual cues (e.g., via lights 104).

In step 310, the method may end, and execution of novelty module 118 may be terminated.

Figure 4:
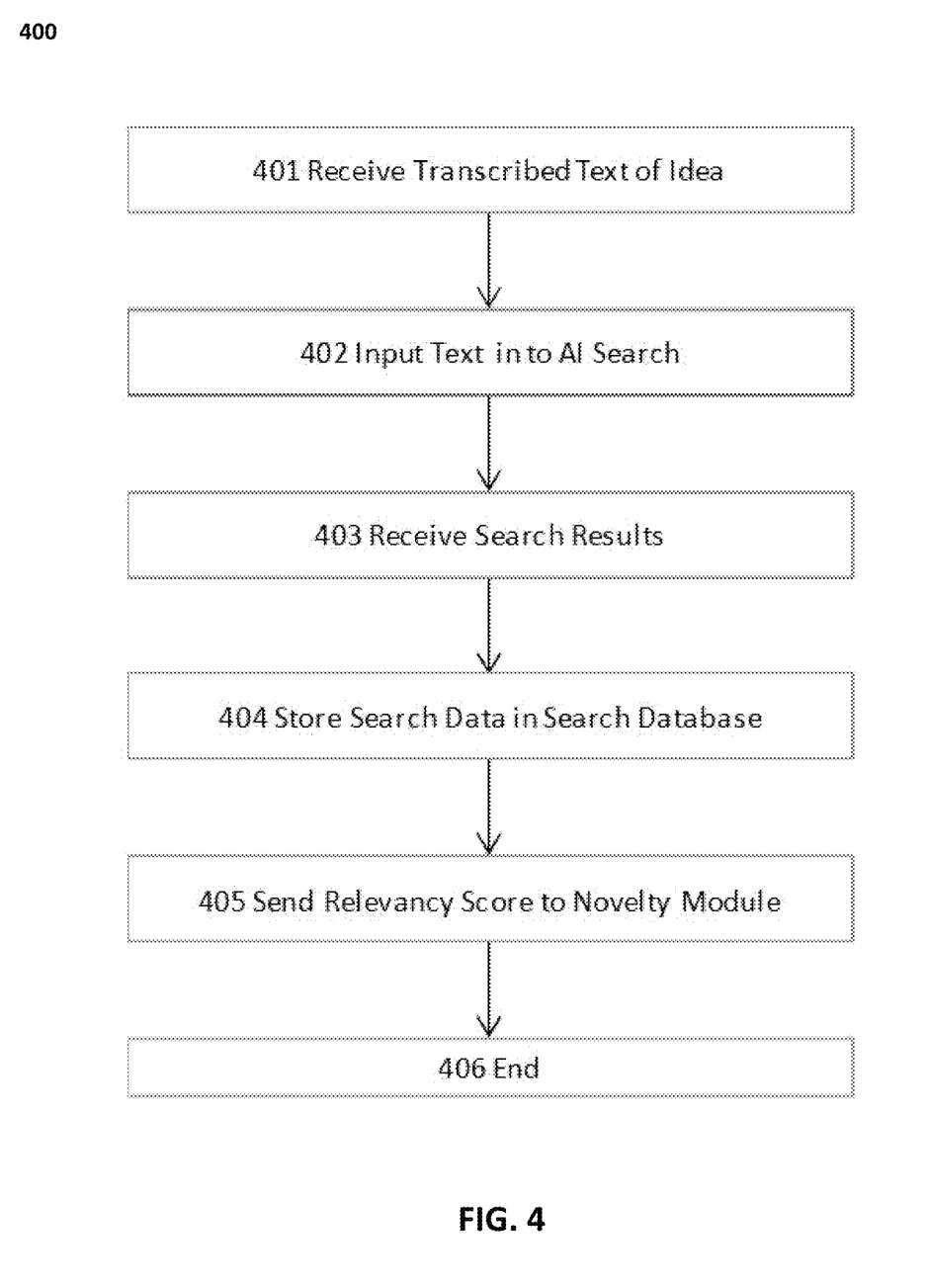
FIG. 4 is a flowchart illustrating an exemplary method for intelligence-driven contextual search for an idea.

FIG. 4 is a flowchart illustrating an exemplary method 400 for intelligence-driven contextual search for an idea. Method 400 may be performed when AI patent search module 125 is executed.

In step 401, the transcribed text may be received by the AI patent search module 125, and in step 402, the text may be used to generate search queries to one or more databased for background data and related technologies. For example, search queries may be generated to search databases that store patents, patent application publications, technical documents, scholarly technical literature, and other types of data.

In step 403, the results (responses to queries) may be received at the AI patent search module 125, and in step 404, the search results may be stored in a temporary database with an relevancy score (e.g., measuring how relevant an identified background document is to the transcribed text of the idea).

In step 405, the relevancy scores for the search results may be stored in the search result database 127, as well as sent back to the novelty module 118, and in step 406, the method may end, thereby termination execution of the AI patent search module 125.

Figure 5:
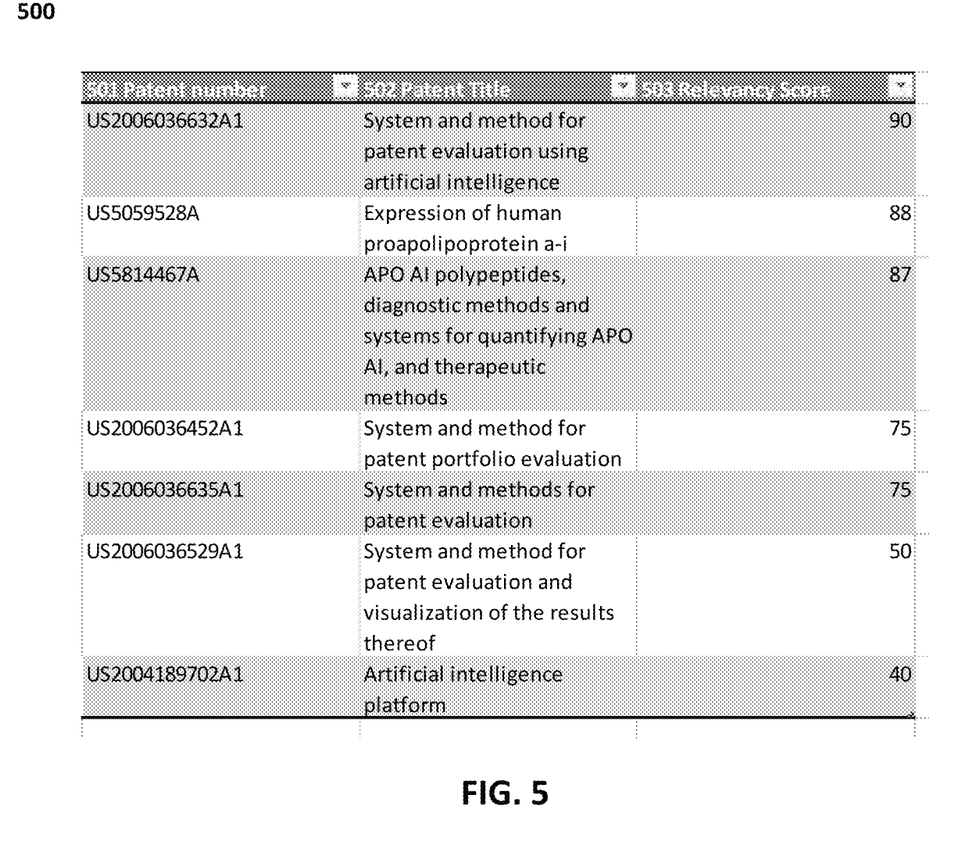
FIG. 5 illustrates an exemplary database of search results retrieved in accordance with the method of FIG. 4.

FIG. 5 illustrates an exemplary database 500 of search results retrieved in accordance with the method of FIG. 4. Database 500 may include column 501 for tracking patent (or other reference) number, column 502 for tracking document titles (e.g., patent titles), and column 503 for tracking relevancy scores (e.g., a metric measuring how similar the reference is to the search text (as transcribed by transcription module 117 and provided by novelty module 118 to AI patent search module 125).

Figure 6:
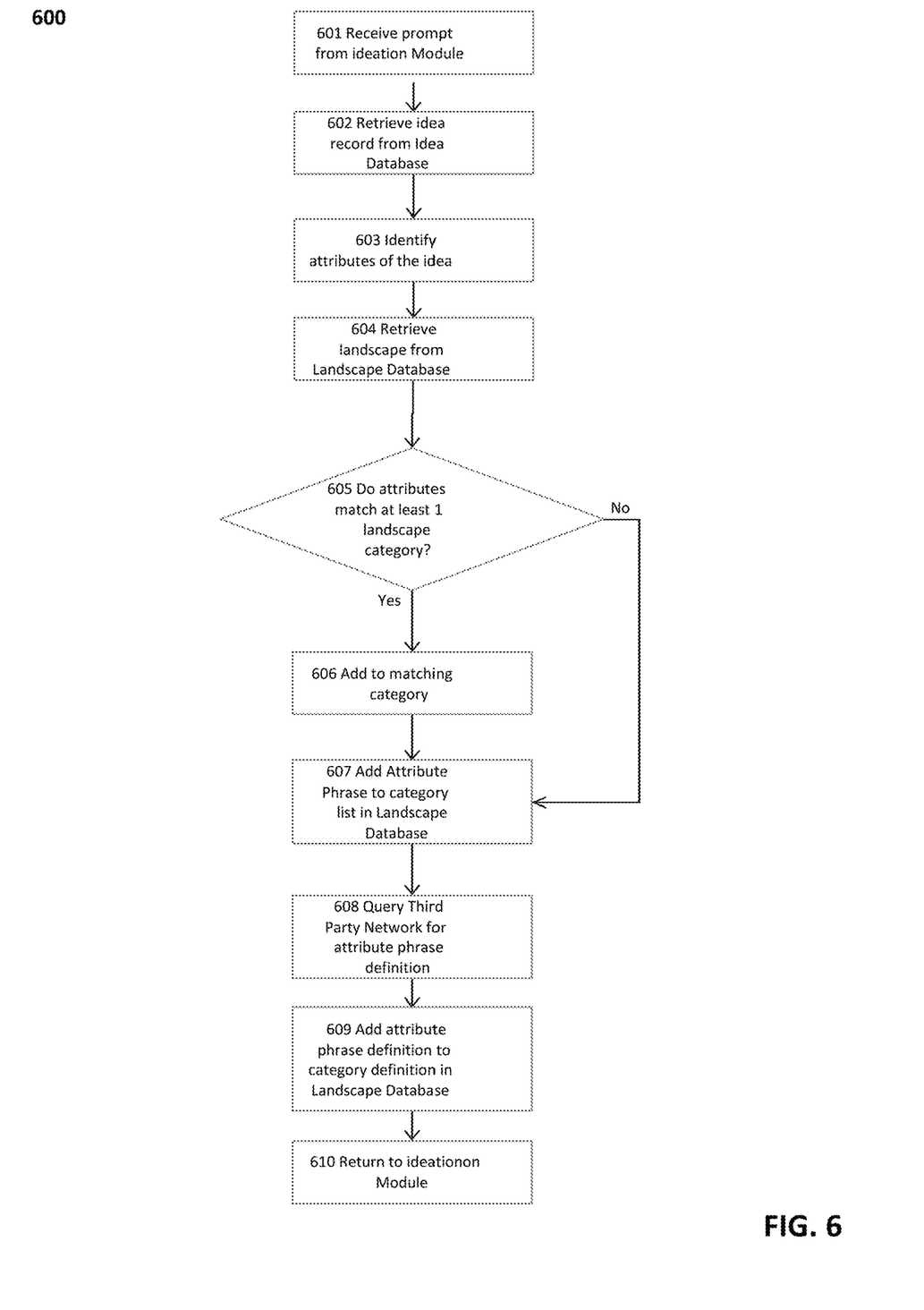
FIG. 6 is a flowchart illustrating an exemplary method for landscape mapping for an idea.

FIG. 6 is a flowchart illustrating an exemplary method 600 for landscape mapping for an idea. Method 600 may be performed by executing landscaping module 134.

In step 601, landscaping module 134 may receive a prompt from the ideation module 112, and in step 602, landscaping module 134 may retrieve the idea record from the idea database 119. In step 603, landscaping module 134 may then identify one or more attributes of the idea based on an intelligence-driven analysis. For example, such analysis may extract keywords from the idea record that may be similar and certain keywords that may be different. Such analysis may further identify relationship or potential relationships between the similar and dissimilar features.

In step 604, landscaping module 134 may retrieve an existing landscape map supplied by the user. Such existing landscape map may be a newly-created map based on user request, as well as based on a template or existing file stored in landscape database 135.

In step 605, landscaping module 134 may compare the attributes of the idea to the landscape category definitions, which may result in indicating that the recorded idea is to be assigned to one of the categories in the landscape. Such indication may be based on similarities, for example, and may be discerned with the use of artificial intelligence and natural language processing systems.

In step 606, landscaping module 134 may identify that the record is assigned to landscape categories that exceed the threshold for correlation scores between the attribute phrase and the landscape definition. If the idea record does not exceed the correlation score threshold for any existing landscape categories, the landscaping module 134 may add the attribute phrase to the category list in the landscape in step 607.

In step 608, the landscaping module 134 may query the third party network 129 for the attribute phrase definition. For example, third party network 129 may include online dictionaries, encyclopedias (e.g., Wikipedia), or other online data sources that may provide attribute definitions that allow for analysis of the idea.

In step 609, landscaping module 134 may add the retrieved attribute phrase definition to the category definition in the landscape database 135, and in step 610, the method may return to the ideation module 112.

FIG. 7 illustrating an exemplary database 700 of a landscape map generated for an idea in accordance with the method of FIG. 6. Landscape database 700—which may correspond to landscape database 135 of FIG. 1—may be initially populated by user-provided landscape categories and definitions. In some embodiments, new categories may be created automatically (e.g., based on detecting threshold levels of keywords associated with categories from existing databases, such as patent databases 126). Landscape database 700 may store information regarding categories, descriptions (e.g., based on attribute phrases extracted from the idea records that may be compared to the landscape category definitions), and identifiers of specific idea records that have a sufficiently high correlation score.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:
1. A system for idea assessment, the system comprising:
one or more landscape databases that stores keywords, contextual data, and respective categories;
a user interface that displays a dynamic landscape map;
a wake-up module associated with a user trigger device, wherein the wake-up module is is triggered by a predetermined audio-based trigger;
a processor that executes instructions stored in memory, wherein execution of the instructions by the processor:
continuously polls for the predetermined audio-based trigger via a microphone,
records audio data based on triggering of the wake-tip module via the microphone during a session, wherein the recorded audio data is in response to questions output by a virtual assistant,
analyzes the recorded audio data to parse keywords associated with the defined idea
compares the keywords with the categories of the dynamic landscape map,
assigns a first attribute phase associated with a first keyword to a category of the dynamic landscape map for which a correlation score threshold is exceeded based on the comparison of the first keyword and keywords associated with the category, and
creates a new category of the dynamic landscape map for a second attribute phase associated with a second keyword that did not exceed the correlation score threshold for any of the categories of the dynamic landscape map.

2. The system of claim 1, wherein at least one of the landscape databases is remote, and further comprising a communication interface that sends the keywords to the at least one landscape database.

3. The system of claim 1, wherein the processor updates the dynamic landscape map in real-time during a session associated with the defined idea.

4. The system of claim 1, wherein the processor further generates a new dynamic landscape map for the defined idea, the new dynamic landscape map including a plurality of categories.

5. The system of claim 4, wherein the processor generates the new dynamic landscape map based on comparing the defined idea to a definition associated with each of the categories.

6. A method for idea assessment, the method comprising:
storing keywords, contextual data, and respective categories at one or more landscape databases;
receiving data regarding a defined idea via a user interface;
continuously polling, at a wake-up module of a user trigger device, for a predetermined audio-based trigger via a microphone; and
executing instructions stored in memory, wherein execution of the instructions by a processor:
records audio data based on triggering of the wake-up module via the microphone during a session, wherein the recorded audio data is in response to questions output by a virtual assistant,
analyzes the recorded audio data to parse keywords associated with the defined ideas from the received data,
compares the keywords with the categories of a dynamic landscape map,
assigns a first attribute phase associated with a first keyword to a category of the dynamic landscape map for which a correlation score threshold is exceeded based on the comparison of the first keyword and keywords associated with the category, and
creates a new category of the dynamic landscape map for a second attribute phase associated with a second keyword that did not exceed the correlation score threshold for any of the categories of the dynamic landscape map.

7. The method of claim 6, wherein at least one of the landscape databases is remote, and further comprising a communication interface that sends the keywords to the at least one landscape database.

8. The method of claim 6, further comprising:
updating the dynamic landscape map in real-time during a session associated with the defined idea.

9. The method of claim 8, wherein the dynamic landscape map is updated based on new query results corresponding to new keywords.

10. The method of claim 6, further comprising:
generating a new landscape map for the defined idea, the new dynamic landscape map including a plurality of categories.

11. The method of claim 10, wherein the new dynamic landscape map is generated based on comparing the defined idea to a definition associated with each of the categories.

12. A non-transitory, computer-readable storage medium, having embodied thereon a program executable by a processor to perform method for idea assessment, the method comprising:
storing keywords, contextual data, and respective categories at one or more landscape databases;
receiving data regarding a defined idea via a user interface;
continuously polling, at a wake-up module of a user trigger device, for a predetermined audio-based trigger via a microphone;
recording audio data based on triggering of the wake-up module via the microphone during a session, wherein the recorded audio data is in response to questions output by a virtual assistant;
analyzing the recorded audio data to parse keywords associated with the defined ideas from the received data,
comparing the keywords with categories of a dynamic landscape map,
assigning a first attribute phase associated with a first keyword to a category of the dynamic landscape map for which a correlation score threshold is exceeded based on the comparison of the first keyword and keywords associated with the category; and
creating a new category of the dynamic landscape map for a second attribute phase associated with a second keyword that did not exceed the correlation score threshold for any of the categories of the dynamic landscape map.

13. The non-transitory, computer-readable storage medium of claim 12, further comprising instructions executable to identify relationships or potential relationships between similar or dissimilar features of the categories of the dynamic landscape map.

14. The non-transitory, computer-readable storage medium of claim 12, further comprising instructions executable to:
query a third-party network for an attribute phrase definition; and
add a received attribute phrase definition to a category definition in the landscape database.

15. The method of claim 6, further comprising:
identifying relationships or potential relationships between similar or dissimilar features of the categories of the dynamic landscape map.

16. The method of claim 6, further comprising:
querying a third-party network for an attribute phrase definition; and
adding a received attribute phrase definition to a category definition in the landscape database.

* * * * *